April 27, 1926.

T. J. NEWMAN

RVAH METER TESTING SWITCH

Filed July 26, 1924  2 Sheets-Sheet 1

1,582,070

Inventor
Thomas J. Newman.
By Freese and Bond
Attorneys

Patented Apr. 27, 1926.

1,582,070

UNITED STATES PATENT OFFICE.

THOMAS J. NEWMAN, OF CANTON, OHIO, ASSIGNOR TO THE SUPERIOR SWITCHBOARD & DEVICES COMPANY, OF CANTON, OHIO, A CORPORATION OF OHIO.

RVAH-METER-TESTING SWITCH.

Application filed July 26, 1924. Serial No. 728,503.

*To all whom it may concern:*

Be it known that I, THOMAS J. NEWMAN, a citizen of the United States, residing at Canton, in the county of Stark and State of Ohio, have invented certain new and useful Improvements in RVAH-Meter-Testing Switches, of which the following is a specification.

This invention relates to meter testing switches, and more particularly to a switch especially designed for use in connection with testing of reactive volt ampere hour meters, commonly referred to as RVAH meters.

The objects of the invention are to provide a test switch so constructed that the normal position of the switch allows the use of the auto transformer, and the testing position of the switch permits the meter potential to be placed the same as the kilowatt hour meter by merely throwing the switch to test position, thus standardizing the testing of the RVAH meter with the KWH meter.

It is a further object of the invention to so arrange the switching members and contact jaws that it is impossible to short circuit any of the potential leads to or from the meter when switching from the normal to the test position, and to so construct the switch bar that it is impossible to close the door or cover of the switch box unless the switch is in the normal position.

Figure 1:
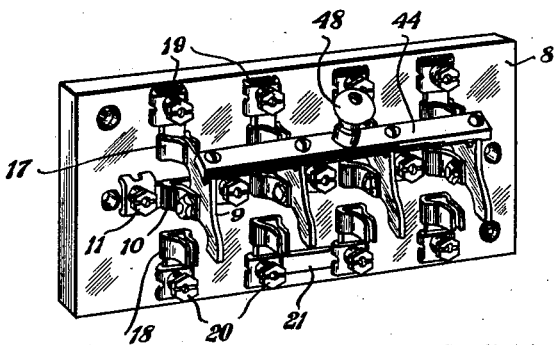
Figures 2, 3:
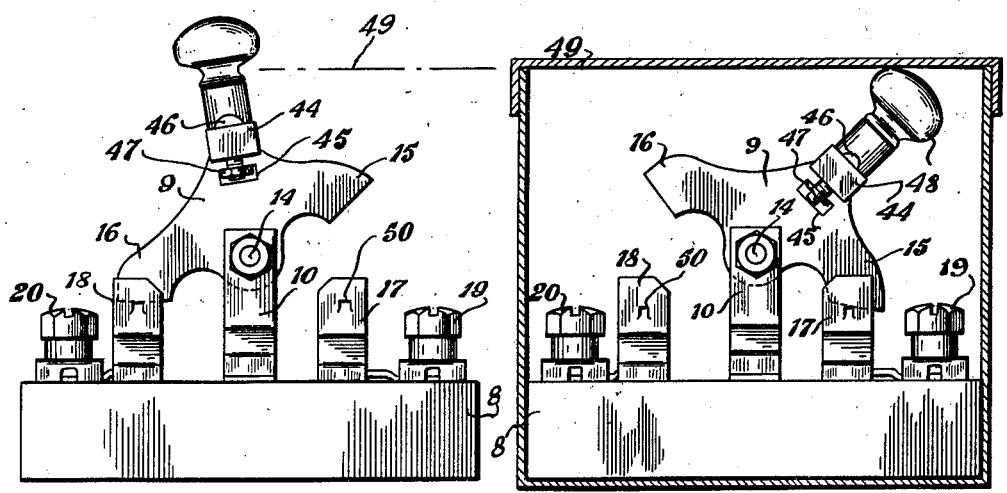

The above and other objects may be attained by constructing the switch in the manner illustrated in the accompanying drawings, in which, Figure 1, is a perspective view of a test switch embodying the invention;

Fig. 2, a side elevation of the same showing the parts in the testing position;

Fig. 3, a similar view showing the parts in the normal position; and

Figure 4:
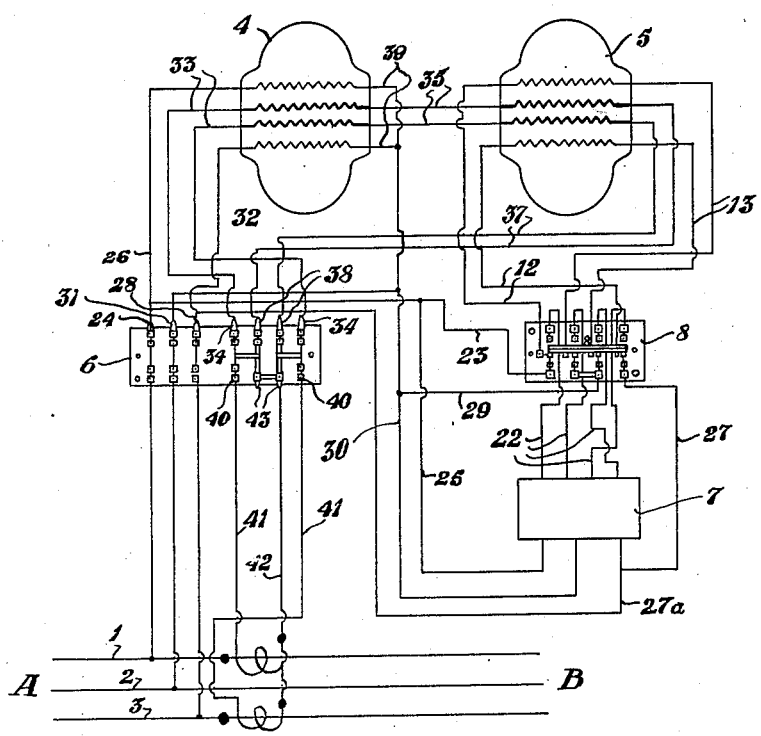

Fig. 4, a wiring diagram showing the application of the approved test switch.

Similar numerals indicate corresponding parts throughout the drawings.

The wiring diagram illustrates the application of the improved switch in connection with a three phase, three wire circuit, the lines of which are shown at 1, 2 and 3, the source of electric energy being indicated at A and the load at B. A KWH meter is indicated at 4 and an RVAH meter at 5. An approved type of test switch, which may be the switch shown in a copending application, is illustrated at 6. This switch is located between the circuit wires 1—2—3 and the potential coils of the meter 4. The potential coils of the meter 5 are connected to the auto transformer 7 through the test switch to which the present invention pertains, which is shown mounted upon an insulation block 8.

This switch is illustrated as a four pole, double terminal switch. Four brackets are provided through the longitudinal center of the insulation block 8 for pivoting the switch blades 9, these brackets being spaced from each other and indicated by the numeral 10.

A binding post 11 is connected with each of the brackets, wires 12 leading from the two outer binding posts to one side of the potential coils of the RVAH meter 5, and wires 13 leading from the two inner binding posts to the opposite sides of said coils.

Each of the switch blades 9 is pivoted intermediate its extremities, as at 14, to the adjacent bracket 10, and is provided at opposite ends with the contact engaging portions 15 and 16, adapted for alternate engagement with the bifurcated contact jaws 17 and 18 respectively, for the normal operation of the circuit or for testing the RVAH meter.

A binding post 19 is connected to each of the contact jaws 17, and a similar binding post 20 is connected to each of the contact jaws 18. The two central or inner jaws 18 are connected by a bridge member 21.

Each of the binding posts 19 is connected, by a wire 22, with the auto transformer 7. One of the outer binding posts 20 is connected by a wire 23 with the contact 24 of the switch 6, a wire 25 leading therefrom to the auto transformer, and a wire 26 leading from said contact 24 to one side of one of the potential coils of the KWH meter 4.

The other outer binding post 20 is connected by a wire 27 with the wire 27ª which leads from the auto transformer to the contact 28 of the switch 6. One of the central binding posts 20, which are bridged by the member 21, is connected by a wire 29 with a wire 30 leading from the contact 31, of the switch 6, to the same side of the auto transformer as the wires 25 and 27.

The contact 28 of the switch 6 is connected to the lower potential coil of the KWH meter, upon the same side as the wire 26, by a wire 32, and a pair of wires 33 connect the same side of the current coils of said meter with contacts 34 upon the switch 6.

The opposite sides of the current coils of the KWH meter are connected by wires 35 with one side of the current coils of the RVAH meter 5, the other side of said current coils being connected by wires 37 to the contacts 38 of the switch 6. Wires 39, upon the same side of the potential coils of the KWH meter as the wires 35, are connected together and joined to the wire 30.

The two contacts 40 of the switch 6, are connected to wires 41, each of which is connected with a current transformer coil located in the circuit of one of the line wires 1 or 3, both of said coils being connected by a wire 42 with one of the contacts 43.

An insulation connecting bar 44 connects all of the switch blades 9. This connection may be accomplished by providing an inverted T-shaped slot 45 in the upper edge of each switch blade. For a purpose hereinafter described, each of these slots is located closer to the end 15 of the switch blade than to the other end thereof.

Bolts 46 are passed downward through the bar and engaged by nuts 47 which are located in the slots 45. A handle 48 is connected to the intermediate portion of the bar 44, being located radially to the pivotal point 14 of the blades.

When the switch is in the normal position, shown in Fig. 3, the handle 48 is in position to permit closing of the usual cover or door 49 of the switch box, the closed position of which is indicated by the broken line 49. However, when the switch is in the testing position, shown in Fig. 2, the handle extends a considerable distance beyond this position and will not permit the door of the switch box to be closed.

Should the operator, after testing the RVAH meter, carelessly leave the switch in the testing position, it will be seen that he cannot close the door of the switch box, or replace the removable cover upon the block and this will instantly notify him that the switch is in the testing position, making it necessary for him to throw the switch into the normal position before closing the door.

The jaws 17 and 18 may be provided with stops, in the form of tangs 50 stamped or punched from the jaws to engage the switch blade and limit the throw of the same in each direction.

I claim:

1. A switch adapted to be located within a switch box provided with a door, and comprising a spaced pair of contacts, a switch blade pivoted intermediate its ends, between said contacts, each end of the blade being arranged to engage one of the contacts, and a handle upon the blade, said handle being located at such an angle that the door of the switch box cannot be closed when the blade is engaged with one of the contacts.

2. A switch adapted to be located within a switch box provided with a door, and comprising a spaced pair of contacts, a switch blade pivoted intermediate its ends, between said contacts, each end of the blade being arranged to engage one of the contacts, and a handle upon the blade, said handle being located at such an angle that the door of the switch box can be closed only when the switch blade is in engagement with one of said contacts.

3. A test switch adapted to be located within a switch box provided with a door, said switch including a plurality of spaced switch blades pivoted in alinement, a spaced row of contacts arranged to be engaged by one end of each switch blade in the normal position, a spaced row of contacts arranged to be engaged by the other end of each blade in the testing position, and a handle connected to said switch blades at one side of the center of each blade whereby the handle will prevent closing of the door of the switch box when the switch is in the testing position.

4. A switch adapted to be covered by a removable cover and comprising a spaced pair of contacts, a switch blade pivoted intermediate its ends, between said contacts, each end of the blade being arranged to engage one of the contacts, and a handle upon the blade, said handle being located at such an angle that the removable cover cannot be replaced when the blade is engaged with one of the contacts.

In testimony that I claim the above, I have hereunto subscribed my name.

THOMAS J. NEWMAN.